June 21, 1966  R. C. DIETZ  3,257,031
MOBILE SERVICE STATION
Filed July 30, 1964  5 Sheets-Sheet 1

RAYMOND C. DIETZ
INVENTOR.

BY
Ely Silverman
ATTORNEY

June 21, 1966  R. C. DIETZ  3,257,031
MOBILE SERVICE STATION

Filed July 30, 1964  5 Sheets-Sheet 2

RAYMOND C. DIETZ
INVENTOR.

BY
Ely Silverman
ATTORNEY

June 21, 1966 R. C. DIETZ 3,257,031
MOBILE SERVICE STATION
Filed July 30, 1964 5 Sheets-Sheet 3

RAYMOND C. DIETZ
INVENTOR

BY Ely Silverman
ATTORNEY

RAYMOND C. DIETZ
INVENTOR.

BY *Ely Silverman*
ATTORNEY

June 21, 1966 R. C. DIETZ 3,257,031
MOBILE SERVICE STATION
Filed July 30, 1964 5 Sheets-Sheet 5

INVENTOR.
RAYMOND C. DIETZ
BY
Ely Silverman
ATTORNEY

United States Patent Office 3,257,031
Patented June 21, 1966

3,257,031
MOBILE SERVICE STATION
Raymond C. Dietz, 1000 S. Main, Borger, Tex.
Filed July 30, 1964, Ser. No. 386,297
4 Claims. (Cl. 222—23)

This apparatus comprises a powered mobile vehicle with capacity for gasoline storage, a regulation dispensing pump, air compressor and tank and, in a separate compartment a battery-booster; the dispensable fuel capacity of the vehicle is adequate to profitably occupy an attendant-operator for several hours at a time while providing sufficient cargo space for apparatus providing the accessory services and merchandise the public has come to expect at the local gasoline service station but with additionally, convenience of safe door-to-door service.

In the preferred embodiment, the apparatuses of this mobile station are interrelated to each other not only in the service performed by the combination but also in the permissive sequence of operations.

One object of this invention is to provide a gasoline-carrying vehicle wherein the weight of the fluid carried is used to stabilize the vehicle.

Another object of this invention is to provide a vehicle specifically adapted to provide at any desired location the normal routine operations of a service station, which also avoids provoking the fear of a public appearance of gasoline in bulk.

Yet another object of this invention is to provide a mobile service station vehicle which utilizes the carrying space of the vehicle and the motive power of that vehicle in a sequence related to the operation of gasoline dispensing to provide where and when needed the usual automobile service station operations and supplies.

Since it is illegal to sell gasoline without a metering device to consumers in order to have the tax calculated it is necessary that the dispensing of the gasoline be provided with an approved metering system.

These and other objects of this invention will become apparent to those skilled in the art on study of the below specification and drawings, which drawings form a part of this specification and wherein like numbers refer to like parts throughout and wherein.

Figure 1:
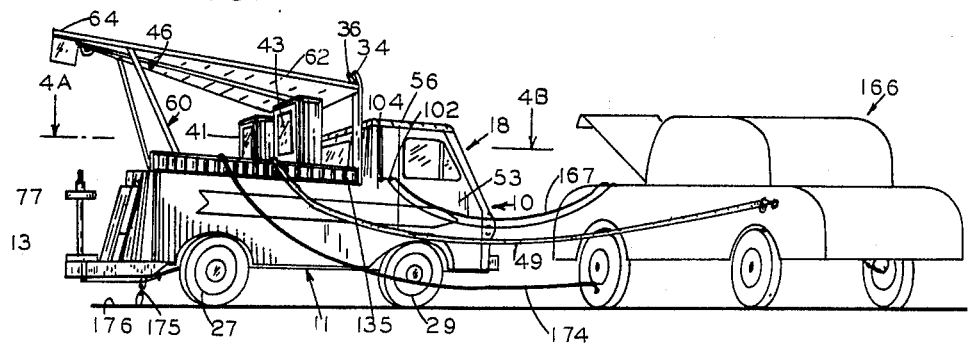
FIGURE 1 is a side view of one apparatus according to this invention shown servicing an automobile.

The apparatus 10 comprises a unitary frame 11 on which are supported and to which there are firmly attached a front, closed compartment 18 which is provided with conventional doors for access thereto, and a rear compartment 12 open at its sides and rear. The frame comprises left and right longitudinal steel I-beams which are joined together by transversely extending steel I-beams and these transverse and longitudinal members are welded together.

The frame 11 is supported on wheels 26, 27, 28 and 29. The frame 11 and compartments 12 and 18 are formed of steel and are firmly attached to each other. The atmospheres within compartments 12 and 18 are definitely and completely separated from each other by a rear wall 50 of the compartment 18.

The open compartment 12 comprises a roof 16, a floor compartment 31, a left side wall compartment 33, and a right side wall compartment 35. The floor and the side compartments are hollow; the volumes between each of the walls forming those compartments provide, respectively, liquid-tight floor chamber 37 and left side wall chamber 38 and right side wall chamber 39, each of which is used for the storage of gasoline.

It is a feature of this invention that the interior walls of the side wall compartments and the top of the floor compartment form the sides and bottom of a working space shell in compartment 12. The top of the side walls are below the level of the bottom of the windows in the closed compartment 18. The top of the floor compartment is below the level of the top of the wheels as 26, 27, 28 and 29. Accordingly, the liquid in the bottom tank serves to improve the stability of the vehicle by providing a low center of gravity.

In the preferred embodiment of FIGURE 1, the open compartment 12 is provided with a rearwardly extending base 13. This base is a sturdy, steel sheet that is firmly attached to a rigid extension of the frame 11 and supports a tire-changing tool base.

The wall tanks 31, 33 and 35 are provided with vent lines 32, 34 and 36, respectively, which open to the top of the roof 16.

The roof 16 is upwardly and rearwardly sloped and comprises a frame support 60 and a roof surface 62. The front portion of the roof extends the full width of the vehicle. The roof extends from the rear of the closed compartment 18 to beyond the rear of the frame and bottom and side portions of the compartment 12.

The roof surface 62 is imperforate, and, in the preferred embodiment made of sheet steel. The roof frame is firmly supported at walls 52 and 54 by front posts 65 and 66. Rear roof posts 68 and 69 are supported on the top of compartments 33 and 35 and extend upward to support a winch support 17: a lighting fixture 46 is also supported on the lower surface of the roof.

There is a substantial vertical space between the bottom of the roof 16 and the top of the side walls 33 and 35. As the roof 62 slopes upwardly and to the rear it provides that the air which passes over the roof of compartment 18 during travel forces the roof 62 downwardly, especially where it is widest, and thereby increases the stability of the vehicle 10 during its travel; also, the roof and the open sides of the compartment 12 provide that the air which travels past the side of the compartment 18 is in turbulent air flow in back of compartment 18 and scrubs out whatever gasoline vapors may be present in that area during the travel of the truck.

The gasoline pumps as 40 and 42 are operatively connected to the tanks 37, 38 and 39 and are of conventional structure as in United States Patents 2,113,676, 2,124,614 or 2,150,025 and in particular, as in United States Design Patent 101,739.

These pumps 40 and 42 are mounted in the front portion of compartment 12 and their meter faces 41 and 43 project above the tops of the side wall compartments 33 and 35. Each pump is mechanically driven by a grounded power take-off located in the closed compartment 18 of the apparatus 10.

The closed compartment 18 comprises a rear wall 50, left side wall 52 and a right side wall 54, and floor 55.

The rear wall 50 is attached at its bottom to frame 11 and to the bottom of the floor compartment 31 and is attached at its sides to the front surfaces of the left side wall compartment 33 and the right side wall compartment 35 and extends thereabove.

An imperforate roof 56 joins the side walls 52 and 54, the rear wall 50, and the conventional closed front wall 58 and its window 59. The closed compartment or cab 18 is a steel casing with windows as 51 in door 53 in wall 54 and a corresponding window in the door for wall 52 and completely envelopes power take-off mechanisms and battery-booster relays and separates the atmosphere on the inner side of the compartment 18 from the outer side thereof and provides an electrical as well as mechanical shield between the rear and front compartments.

The motor 24 for the apparatus 10 is supported on the frame 11 below the floor 55 of the front closed compartment 18 and is operatively connected by conventional clutch mechanism to the rear drive wheels 26 and 27. A power take-off subassembly 20 is connected by a belt 21 to the motor 24 and is supported and firmly attached to the floor 55.

The power take-off subassembly 20 comprises a first rotatable steel drive shaft 80, a power pulley 82 fixed thereon, an eccentric belt-tightening lever 83, a coupling 86 and driven shafts 90, 150 and 152. Pulley 82 is attached by belt 21 to the motor 24. The shaft 80 is rotatably supported in bronze bearings 87 and 88 which are attached firmly to the floor 55 and grounded thereto. An eccentric belt-tightening bell crank lever 83 supported on floor 55 for pivotal movement supports at one end thereof a belt-tightening roller which contacts belt 21 and provides for tightening and loosening belt 21 on the pulley 82. A flexible, electrically-insulating rubber coupling 86 firmly connects the drive shaft 80 to the driven steel shaft 90. A pulley 71 fixed on the shaft 90 drives an air compressor 72. Compressor 72 is fixed on floor 55 and is connected to and fills the compressed air tank 74. Shaft 90 also supports and drives pulleys 140 and 142 which are fixed thereto. Shaft 90 is supported on bronze bearings 90A and 90B, also firmly fixed to the floor 55.

A driven shaft 150 is rotatably supported on bronze bearings which are fixed to floor 55; shaft 150 supports a pulley 160 and passes through a gas-tight seal 170 in wall 50 from compartment 18 into compartment 12. Shaft 150 drives the gears in dispensing pump 40. A belt 141 in compartment 18 connects pulleys 140 and 160. An eccentric belt-tightening bell crank lever 151 pivotally supported on floor 55 supports at one end thereof a belt-tightening roller to contact belt 141 and provides for tightening or loosening belt 141 on drive shaft 150.

A driven steel shaft 152 is rotatably supported on bronze bearings fixed to floor 55 and supports a pulley 162 fixed thereto and passes through a gas-tight seal 172 in wall 50 from compartment 18 into compartment 12. Shaft 152 drives the gears in pump 42. A belt 143 in compartment 18 connects pulleys 142 and 162 and is actuated by an eccentric bell crank arm 153 pivotally mounted on pivot 163 on floor 55 having a roller at one end to contact and to tighten or to loosen belt 153 on drive shaft 152. Thereby each of pumps 40 or 42 may be run together with compressor 72.

The air compressor tank 74 is located at and affixed to the bottom of the working space shell 14 of the compartment 12 and is firmly attached thereto and is operatively connected to compressor 72 by a conduit pipe or line 73, which line passes through a gas-tight seal 173 therefor through wall 50 from compartment 18 into compartment 12. The compressed air tank 74 is operatively connected by pipes 137, 138 and 139 to the chambers 37, 38 and 39, respectively, and is provided with a controller 76, which controller maintains the pressure above the liquid in such tanks at a pressure of about 150 pounds per square inch. The two side tanks 33 and 34 each have a total capacity of about 80 gallons and are usually filled with standard gasoline and are connected to one pump, 40, while the floor tank, with a capacity of about 90 gallons, is filled with ethyl gasoline and is connected to the other pump 42, although conventional on and off valves are provided for other connections for construction, repair and maintenance.

The tank 39 is divided by a longitudinal and transverse bulkhead for strength and to prevent shifting of load during turns. The main line 139 to tank 39 divides into lines 181, 182, 183 and 184 for each of the compartments 185, 186, 187 and 188, respectively, of tank 39.

The top surface of each of the wall compartments 33 and 35 provides a supporting rack 130 and 135 for a line of quart cans of oil. These racks each comprise a lower, rigid, L-shaped support, as 131 for rack 130, and an upper rigid retainer as 132. The upper retainer 132 is a flat plate with a lateral lip that extends downward slightly over the front of the cans and is pivotally mounted on rack ends 133 and 134 to the central upper side of the rack. Support 136 for rack 135 is similar to support 131 for rack 130. Each of these horizontally-extending lines of cans provides a clean and definite "line" or appearance as well as clearly indicating availability of an adequate supply of oil for sale in the expected away-from-base period of expected operation of the apparatus 10. Further, the visibility of the meter faces 41 and 43 of pumps 40 and 42, respectively, which extend above the tops of the racks 130 and 135, clearly provides to the viewer the impression of availability of oil and gas in the same cans and by the same meters as available at the usual fixed-to-the-ground service station.

A feature of the location of the tanks 37 and 38 is that the tops thereof be below the level of the top of the compartments 33 and 35. The structure of the gasoline tanks of apparatus 10 is deftly hidden in the apparently small size of the vehicle and thereby avoids provoking any fear of gasoline in bulk. An extra long length (20 feet) of otherwise standard hose, 47 and 49, is provided respectively from each of pumps 40 and 42 to dispense gasoline therefrom. In the preferred embodiment of FIGURES 1 and 2 the conduit lines from tanks 37 and 38 to pump 40 are full of only one kind of gasoline and the lines from tank 39 to pump 42 full of another to avoid dilution thereof prior to dispensing through a metering device.

The tanks 37, 38 and 39 are, in the preferred embodiment, provided with removable rubber liners and those rubber liners are provided with double walls with conventional self-sealants therebetween to avoid leakage in the event of puncture.

As safety is a prime consideration to this travelling service station, in order to lessen the danger of sparks each of the power take-offs used to operate the gasoline pumps is grounded to frame 11 as well as located in the closed compartment 18 and that compartment is separated by the substantially imperforate wall 50 as well as 55, 56, 52 and 54 from the atmosphere about the gasoline pumps in compartment 12. With the gas-tight seals for lines as 73 and shafts 150 and 152, wall 50 is imperforate. The metal shafts as 150 and 152 that pass through the wall 50 are grounded to the frame 11 within compartment 18 to avoid generating sparks in compartment 12.

The mobile service station 10 is designated to supply demands of automobiles and trucks which are unable to get to a fixed-to-the-ground service station. There are many service calls requiring cars to be started, i.e., charged at homes as well as on highways. The mobile service station 10 provides a readily mobile electrical charging, or booster, service for automobile batteries as well as a supply of gasoline, oil and air. For this purpose battery-charging terminals 102 and 104 are provided on the right side wall 54 of the cab or compartment 18, and corresponding battery-charging terminals 103 and 105 are provided on the left side wall 52. The battery-booster or charging terminals 102 and 104 are operated through battery-booster relay subassembly 106 on the right side wall 54: the battery-booster or charging terminals 103 and 105 are operated through battery-booser relay subassembly 107. The subassemblies 106 and 107 are firmly attached to and supported on the same side walls as their terminals as below described.

Subassemblies 106 and 107 are mirror images of each other structurally and are each comprised of similar elements in similar functional relations. Subassembly 106 comprises a casing 110, a battery-booster button 112, a magnetic coil and core 114 and a relay switch arm 120. Casing 110 is a rigid steel casing which completely encloses elements 114 and 120 and is firmly attached to and grounded to the side wall 54. Battery 116 of apparatus 10 is a standard, slightly oversized—66 plates, 65 amperehour, 12-volt—battery. It is connected by a light switch line to the contact points 112′ and 112″ for button 112 and, through such contact points to the coil for the armature 114. The button switch 112 is normally kept open by compression spring 108 and the opening for its shaft is kept sealed by a seal. The energized coil 114 overcomes the tensile force of a tension spring 126 on switch arm 120 and closes the relay switch arm contact point 128 of relay switch arm 120 on the fixed load point 168 and closes the heavy load line circuit from battery 116 through load line 122, terminal 104, cables 167 and 169, and battery 166 of the car 165 being serviced, and contact points 168 and 128 and the heavy return ground line 158 while placing a voltage differential on terminal 102 relative to terminal 104. The casing 110 provides a complete and gas-tight enclosure for contacts 128 and 168 and also for points 112′ and 112″ of button 112. This totally eliminates any sparking in the atmosphere of compartment 18 or access of sparks to any portion of gasoline vapors that might come to compartment 18 from compartment 12 when the booster cables are connected to the battery of a to-be-serviced car 165. An outside booster button 212 is connected to the coil 114 and the line 118 for control of the booster or charging operation from the outside of the truck as well as from the inside. A conventional gas-tight seal is also used on this button. Each of the components of subassembly 107 correspond to the above-discussed components of subassembly 106 and each of said components are assigned reference numerals one unit higher than the corresponding reference numerals for the corresponding components in subassembly 106.

As the apparatus 10 is formed of an all-steel body and the pumps 40 and 42 are welded thereto, there is no static electricity generated therebetween. An electrically conductive line 175 of electrically conductive copper wire and flexible rubber, 1 inch wide and 1½ inch thick, passes from the frame 11 of the apparatus 10 to the ground on which apparatus 10 travels. As the apparatus 10 is provided with a means for grounding the body of the vehicle 10 to the ground, 176 the frame 11 and the pumps as 40 and 42 will be grounded with respect to the tanks 37, 38 and 39 from which the gasoline comes as well as the gasoline which passes along the hoses 47 and 49 of pumps 40 and 42, respectively, and there is a firm though flexible metallic connection between said pumps and all of the length of said hoses. The extra long length of hose attached to the pump grounds to the vehicle as 165 to which the gasoline is transmitted. The tire-changing base 13 supports the tire-changing tool, such as a Coates tire-changing tool 77 which is operated from the air tank 74 by line 78 and control valve 79. This tire tool 77 is firmly attached to the base 13 and frame 11 of the apparatus 10. Compressed air passes from the tank 74 to the tool 77 via a line 78 with a valve 79 for control thereof.

The exhaust pipe 25 of the motor 24 extends to the rear of base 13. The rear end 64 of the roof projects past the rear end of the tire tool frame support base 13 so that the hoist 17, supported at the rear end of the frame for the roof 62, may be operated without hindrance by the rear end of the apparatus 10. In a preferred embodiment of the apparatus of FIGURES 1 and 2, the dimensions thereof are as given in Table I.

TABLE I

Figure 2:
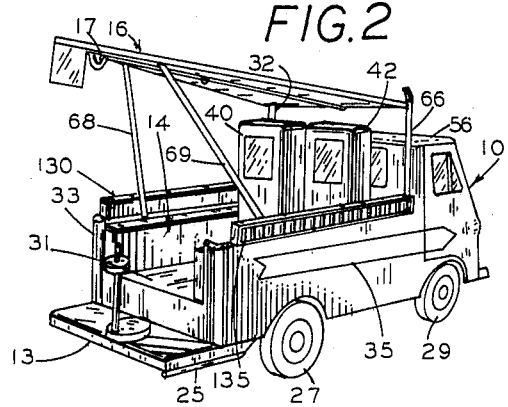
FIGURE 2 is a perspective view of the apparatus of FIGURE 1 as it is seen from a point to the rear and slightly above the right rear corner thereof.
Figure 3:
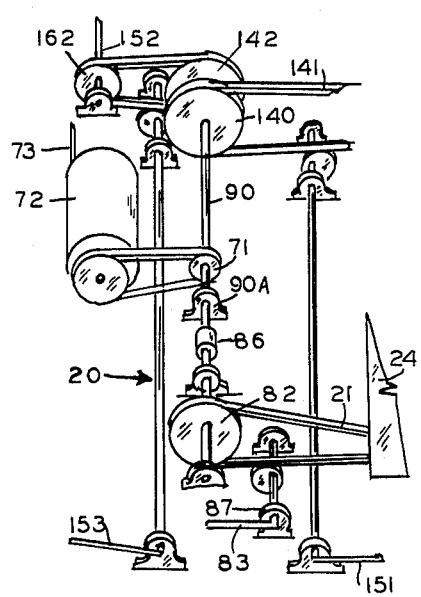
FIGURE 3 is a perspective view of the power take-off used according to this invention in the apparatus of FIGURE 1.
Figure 4:
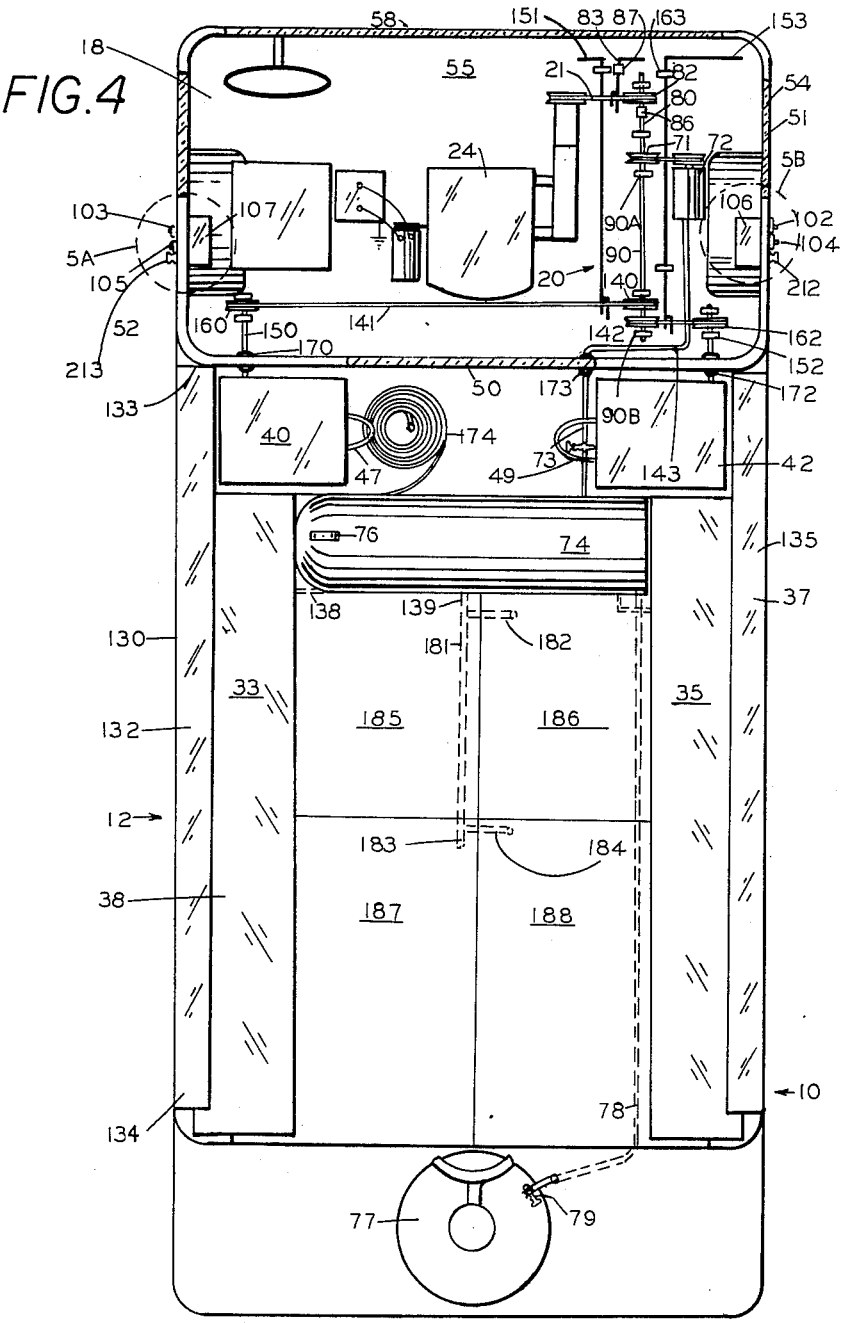
FIGURE 4 is a top plan view of the apparatus of FIGURE 1 of this invention along plane 4A—4B of FIGURE 1.
Figure 5:
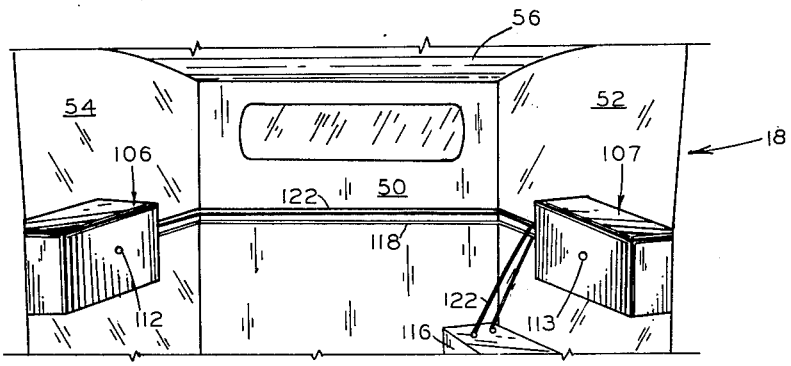
FIGURE 5 is an enlarged view of the battery-booster detail in the cab at zones 5A and 5B of FIGURE 4.
Figure 6:
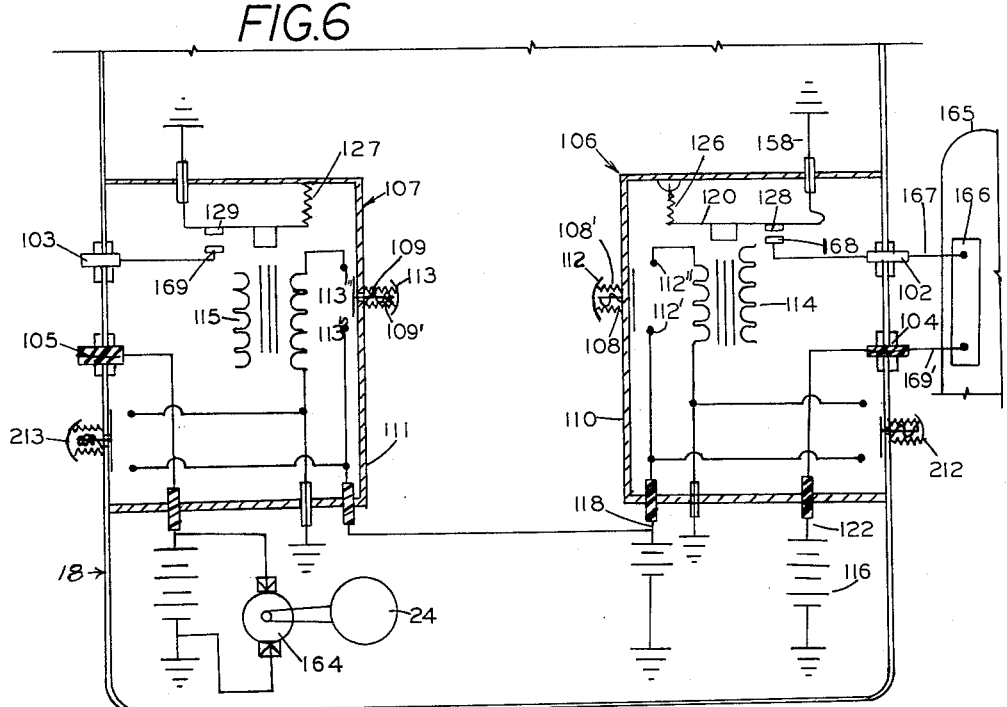
FIGURE 6 is a schematic wiring and structural diagram of the power-booster compartments in zones 5A and 5B of FIGURE 4.
Figure 7:
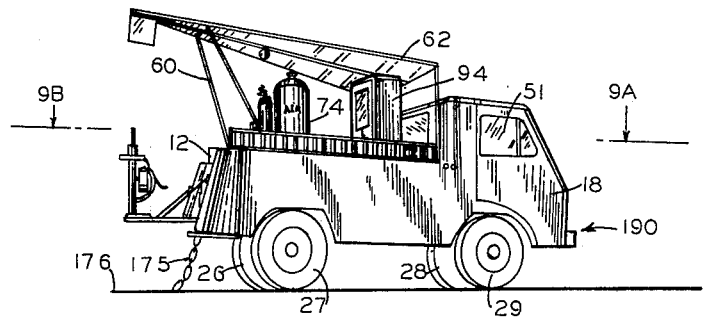
FIGURE 7 is a side view of another, prototype, embodiment of this invention.
Figure 8:
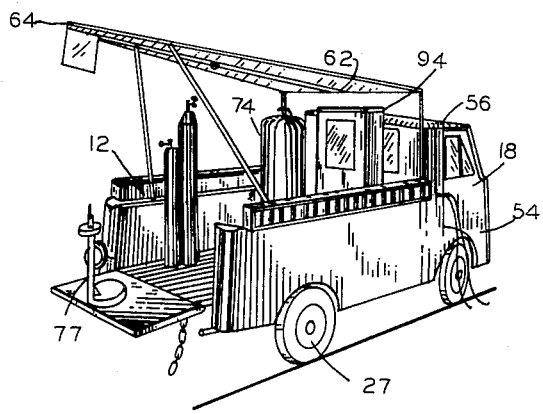
FIGURE 8 is a perspective view of the apparatus of FIGURE 7 as seen from above the right rear corner thereof.
Figure 9:
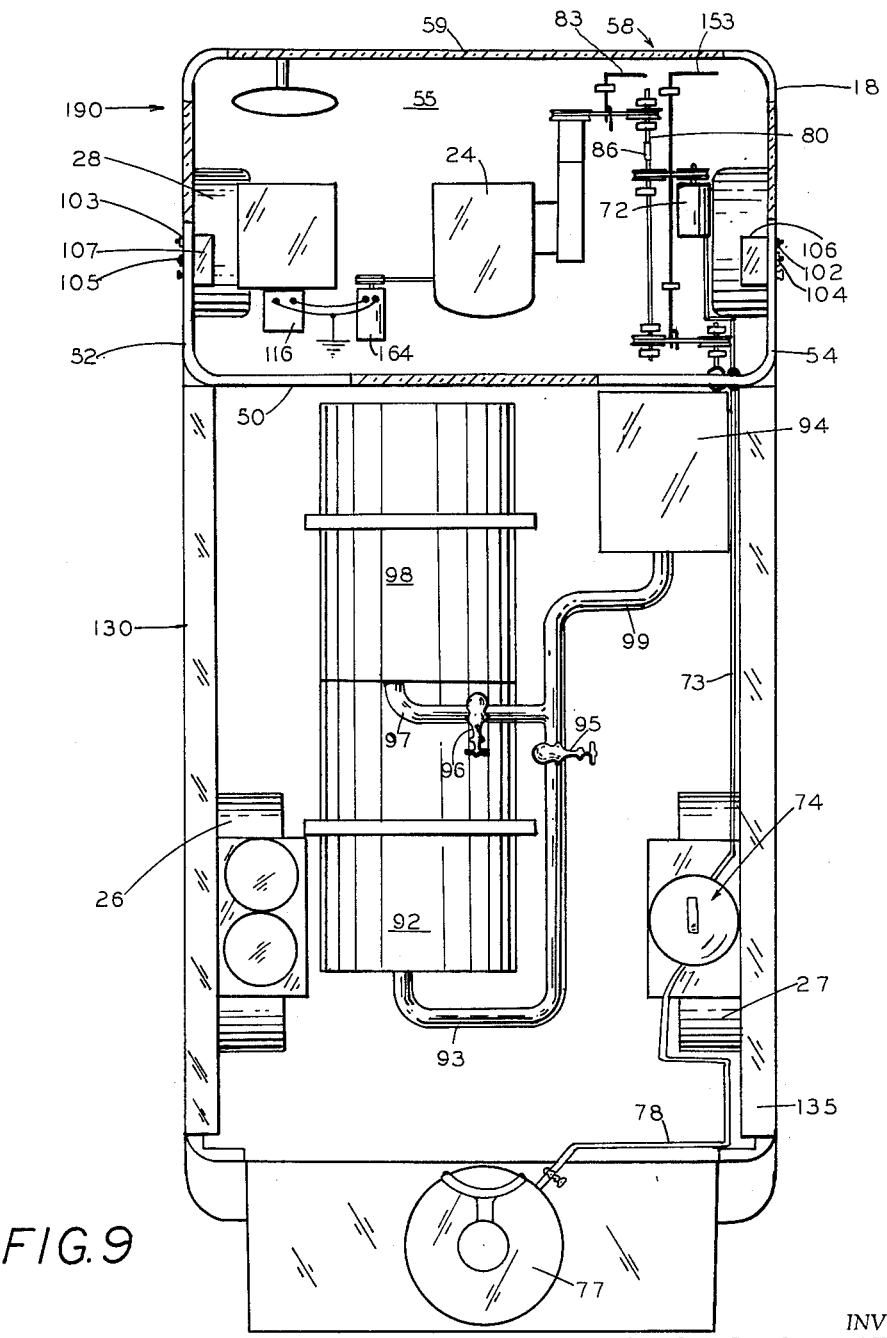
FIGURE 9 is a top plan view of the apparatus of FIGURE 7 showing the arrangement thereof as seen along plane 9A—9B of FIGURE 7.

| Item | Apparatus of Figures 1–2 | Apparatus of Figures 7–9 |
| --- | --- | --- |
| Interior width of compartment 12 | 3′9″ | 5′9″ |
| Height of pumps 40 and 94 from floor of compartment 12 | 5′0″ | 5′0″ |
| Pumps 40 and 94, width | 21″ | 21″ |
| Pumps 40 and 94, depth | 15″ | 15″ |
| Window height, bottom | 3′1″ | 3′1″ |
| Window height, top | 4′5″ | 4′5″ |
| Height of roof 56 | 4′6″ | 4′6″ |
| Floor of compartment 12 to— | | |
| Top of side wall | 14″ | 23″ |
| Top of retainer 135 | 25″ | 34″ |
| Top of retainer 135 to ground 167 | 4′2″ | 4′2″ |
| Length, rear of compartment 33 to— | | |
| Front of wall 58 | 13′5″ | 13′5″ |
| Rear of wall 50 | 7′0″ | 7′0″ |
| Roof 62, height at its front end over floor of compartment 12 | 5′5″ | 5′5″ |
| Roof 62, maximum height | 6′8″ | 6′8″ |
| Tank 37 | 59″ x 12″ x 21″ | |
| Tank 39 | 59″ x 9″ x 44″ | |

In operation the apparatus 10 arrives at the car, as 165, to be serviced; hose 47 is connected to the tank of the car 165 and cables 167 and 169 are connected to the battery 166, the motor 24 continues to run, the eccentric lever arm 83 is positioned to drive the compressor 72, and air from the compressor drives gasoline, as by line or pipe 137 from tank 37 to pump 40. The operator of apparatus 10 concurrently places the bell crank arm, as 151, in position to permit pump 40 to be driven by shaft 150 and fill the tank of car 165 while he holds the button 212 to permit charging of the battery 166. Pumps 40, 42 and 94 are, preferably, of the conventional automatic cut-off type, ceasing to discharge when the tank of the to-be-serviced car is filled. The battery charging continues for a few minutes. Thereafter, a hose line 174 from the compressor 74 is used, while the pump 40 continues to fill the gas tank of car 165, to fill the air in the tires of the car 165. A separate portion of the tank 139, such as 139A, may be filled with water; this portion is operatively connected to the compressed air tank 74 and has a separate discharge hose 239A to permit washing or spraying of a car as 165 with water. The air line hose 174 may also be used to sweep out the interior of the car 165, while the pump 40 is operating. Thereby, the operator is continuously occupied providing services made safely available while dispensing gasoline, the sale of which provides the bulk of income of such an operation, until the tank of the to-be-serviced car is filled completely. During pumping the compressed gas from tank 74 passes to the top of the interior of each closed tank as 37, from the bottom of which a line passes to the dispensing means therefor. The operation of apparatus 190 is similar to that of apparatus 10.

Another embodiment of this invention is shown in FIGURES 7, 8 and 9 as 190. While the overall dimensions and components of similar identifying reference numbers are the same as in the device 10 shown in FIGURES 1 and 2, this apparatus 190 has only one pump, 94, and the power take-off assembly shaft 90 continues directly to pump 94 although the eccentric arm 83 is the same and its operation is the same in the apparatus of FIGURE 1 and of FIGURE 9.

In this embodiment 190, a 110-gallon tank 92 (22″ diameter x 5′ 8″ long) is connected by an outlet conduit 93 and a pump inlet conduit 99 to a metering gasoline pump 94 identical to pump 42. Pumps 40 and 42 are identical. A valve 95 provides for cutoff of the line 93, while another valve 96 connects to a tank outlet conduit 97 leading to a 55-gallon upper tank 98 (2′ 2″ diameter x 2′ 10″ long) filled with ethyl gasoline and conduit 99.

The conduit 99 leads to the metered gasoline pump 94 and a 20-foot hose 47 is provided on said pump to permit that the apparatus 190 will provide gasoline to vehicles, as 165, at a substantial distance from the apparatus 190, as for 10. Dimensions of the apparatus 190 are as given in Table I.

Although in accordance with the provision of the patent statutes, particular preferred embodiments of this invention have been described and the principles of the invention have been described in the best mode in which it is now contemplated applying such principles, it will be understood that the operations, constructions and compositions shown and described are merely illustrative and that my invention is not limited thereto and, accordingly, alterations and modifications which readily suggest themselves to persons skilled in the art without departing from the true spirit of the disclosure hereinabove are intended to be included in the scope of the annexed claims.

I claim:

1. A mobile service station comprising a frame with wheels operatively attached thereto and a motor supported on said frame and in driving connected with at least two of said wheels:

a closed compartment comprising a roof, a rear wall, a left side wall and a right side wall, a floor, and a front wall all firmly attached together, said closed compartment firmly attached to the front portion of said frame;

an open compartment, the interior of the floor of which and the interior of the side walls of which are arranged to carry liquid, comprising a floor, left side walls and right side walls all firmly attached to said frame and forming an upwardly open compartment;

a plurality of gasoline-dispensing units attached to and supported on said open compartment and firmly attached to and electrically grounded to said frame, the said dispensing units comprising a metering device, a pump, and being provided with an indicator of fluid passed through said meter, said indicator located in a window, said window located above the height of the side walls of said open compartment, said windows being visible from the outside of said apparatus;

a roof on said open compartment, said roof extending rearwardly and upwardly, said roof comprising an imperforate surface extending from one side of said open compartment to the other at the front end of said open compartment, the center of area of said roof being closer to the front of said open compartment than to the rear thereof, said roof being attached to said open compartment at its front and rear;

a power take-off mechanism supported on the floor of said closed compartment and driven by said motor and attached to said motor, clutch means for operatively connecting said power take-off means to said motor, an air compressor in said closed compartment and connected to said power take-off means, means operatively connecting said power take-off means to one of said dispensing and metering apparatus, a separate power transmission connecting said power take-off means from said motor to a second dispensing mechanism, each of said power take-off means and power transmission means being grounded to the frame of said apparatus within said closed compartment; and an electrical generator attached to said motor and driven thereby, a casing firmly attached to and connected to each side wall of said closed compartment, an electric battery operatively attached to said generator, an electrically conductive line leading from said battery to each said casing in said closed compartment, a first, externally actuated switch connecting a solenoid in each said casing to said line by contact points within said casing, said solenoid closing a second switch in said each casing leading from said battery through said box to battery-booster terminals on the outside of said closed compartment, said contact points and said second switch being completely enclosed in said casing.

2. An apparatus as in claim 1 comprising also a compressed air tank fixed to and located in said open compartment, pipe conduit means operatively connecting said compressed air tank to the top of the interior portion of each of a plurality of closed tanks in compartments forming the floor and walls of said open compartment, which tanks are arranged to carry liquid, the bottom portion of one of said tanks being operatively connected by conduit means to one of said gasoline-dispensing units and the bottom of another of said tanks being operatively connected to another of said gasoline-dispensing units.

3. An apparatus as in claim 2 wherein said power take-off mechanism comprises one separately-actuated clutch means connecting said power take-off means to one of said dispensing and metering apparatuses and another separately-actuated clutch means operatively connected to said power take-off means for actuating another of said dispensing and metering apparatuses, whereby either one or the other of said metering apparatuses will be actuated by said power take-off means.

4. Apparatus as in claim 2 comprising also a rigid rear support attached to the rear said frame beyond the tanks supported thereby and a pneumatically-operated tool firmly affixed to said rear support frame, said pneumatically-operated tool being operatively connected to said compressed air tank.

References Cited by the Examiner

UNITED STATES PATENTS

| | | | |
|---|---|---|---|
| 2,498,229 | 2/1950 | Adler | 222—178 X |
| 2,903,189 | 9/1959 | Patton | 222—178 X |

LOUIS J. DEMBO, *Primary Examiner.*

CHARLES R. CARTER, *Examiner.*